Feb. 16, 1960
L. BODDY
2,925,572
TEMPERATURE MEASURING PROBE
Filed July 26, 1955
4 Sheets-Sheet 4
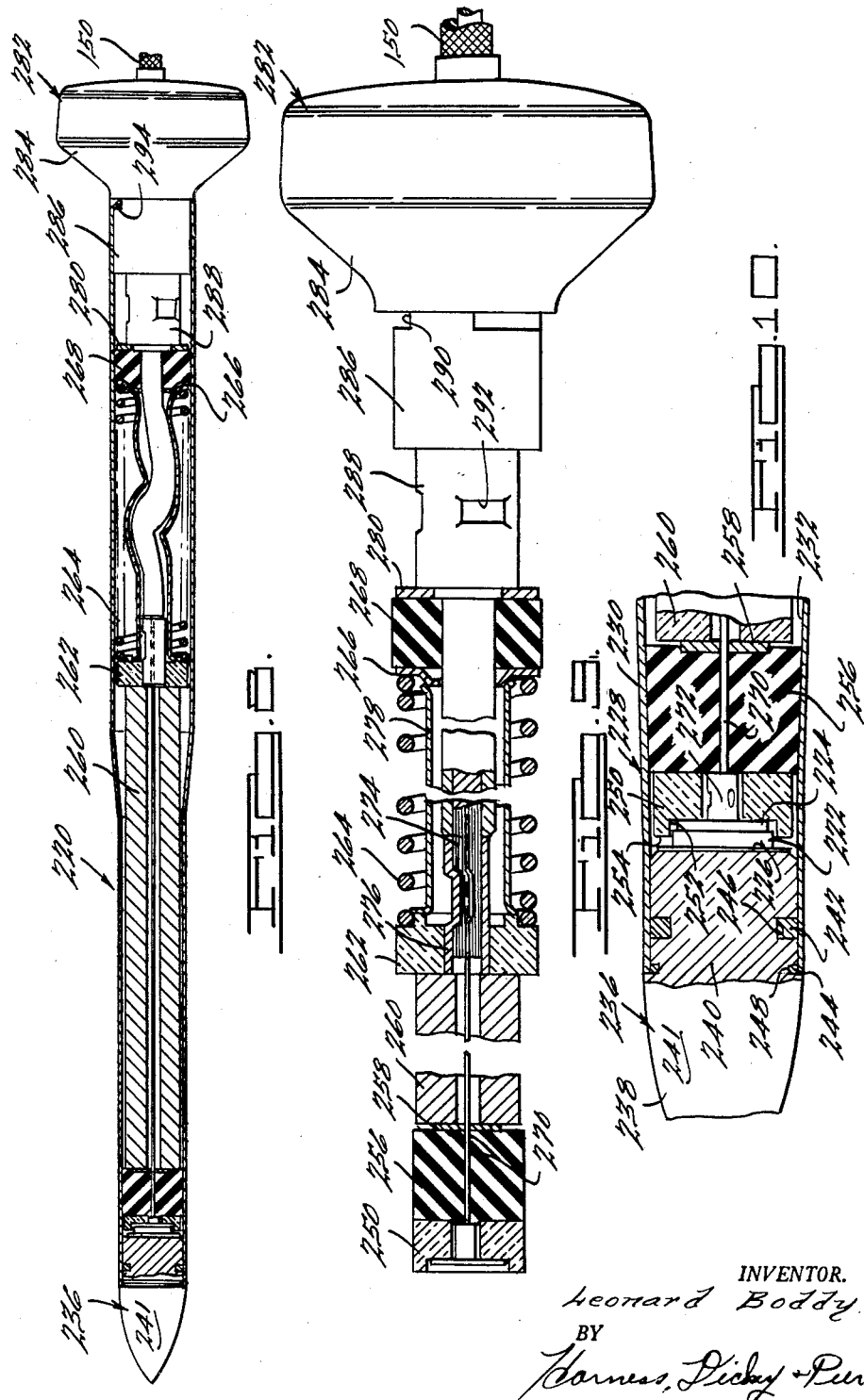
INVENTOR.
Leonard Boddy
BY
Harness, Dickey & Pierce
ATTORNEYS

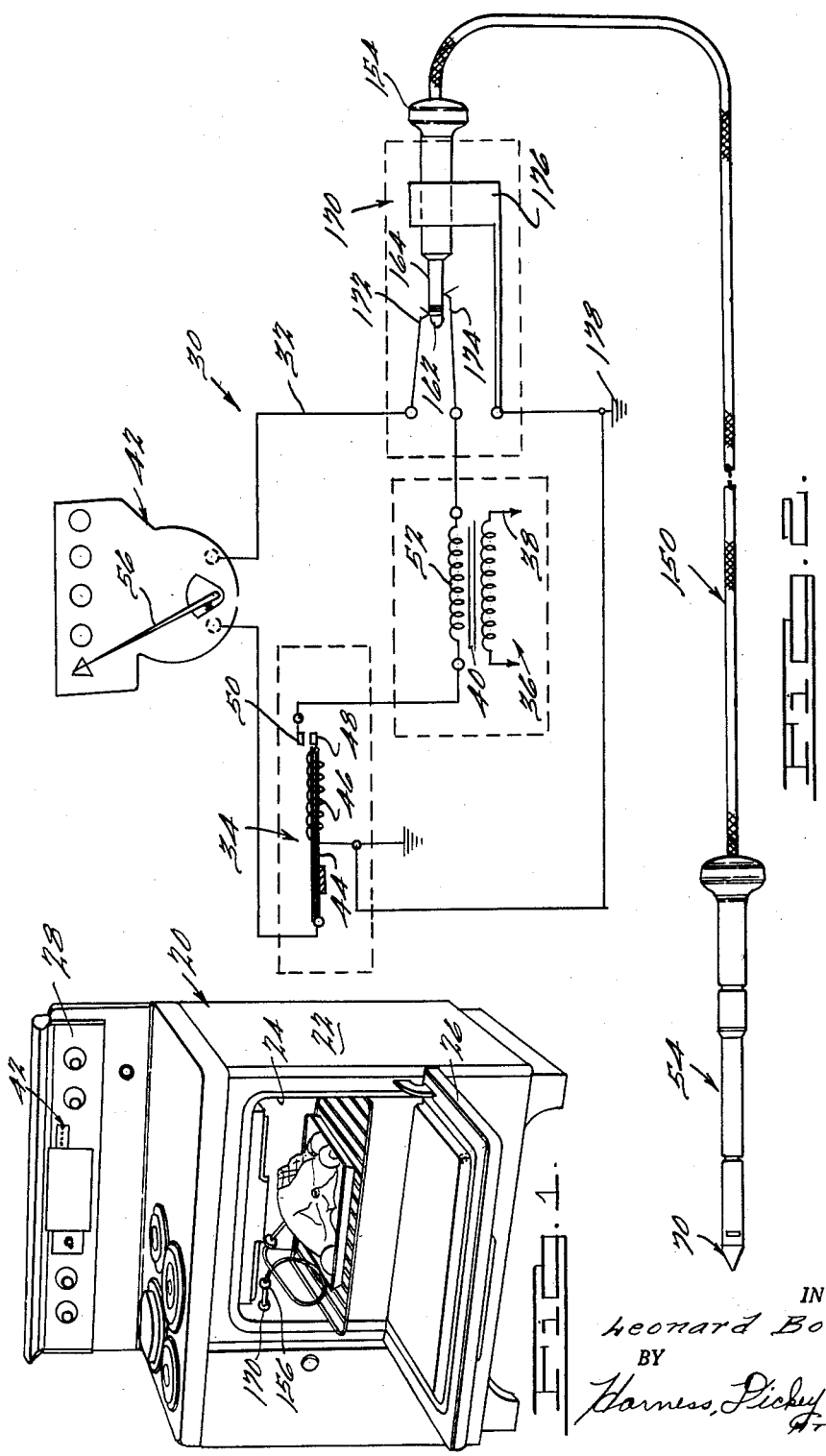

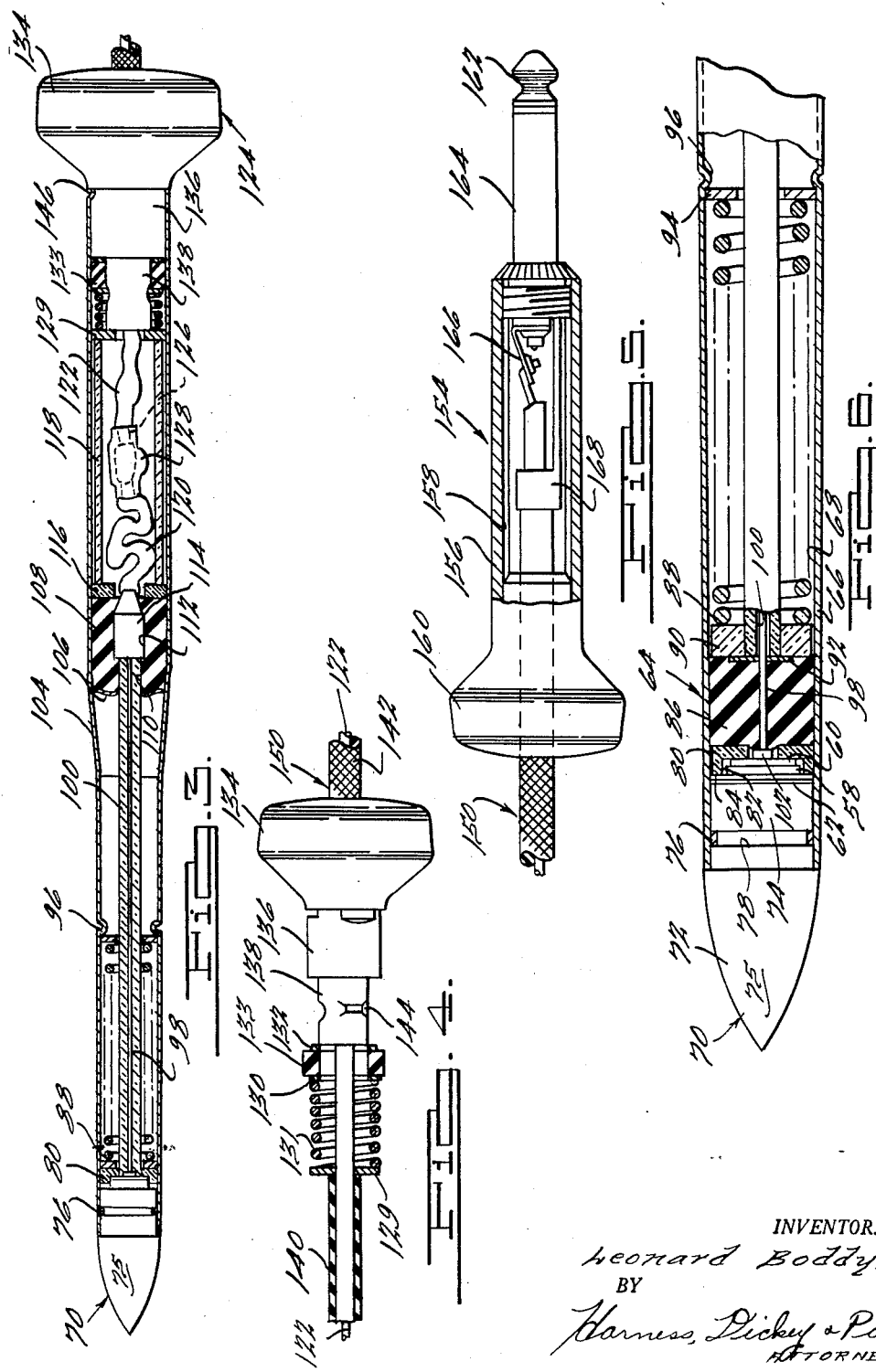

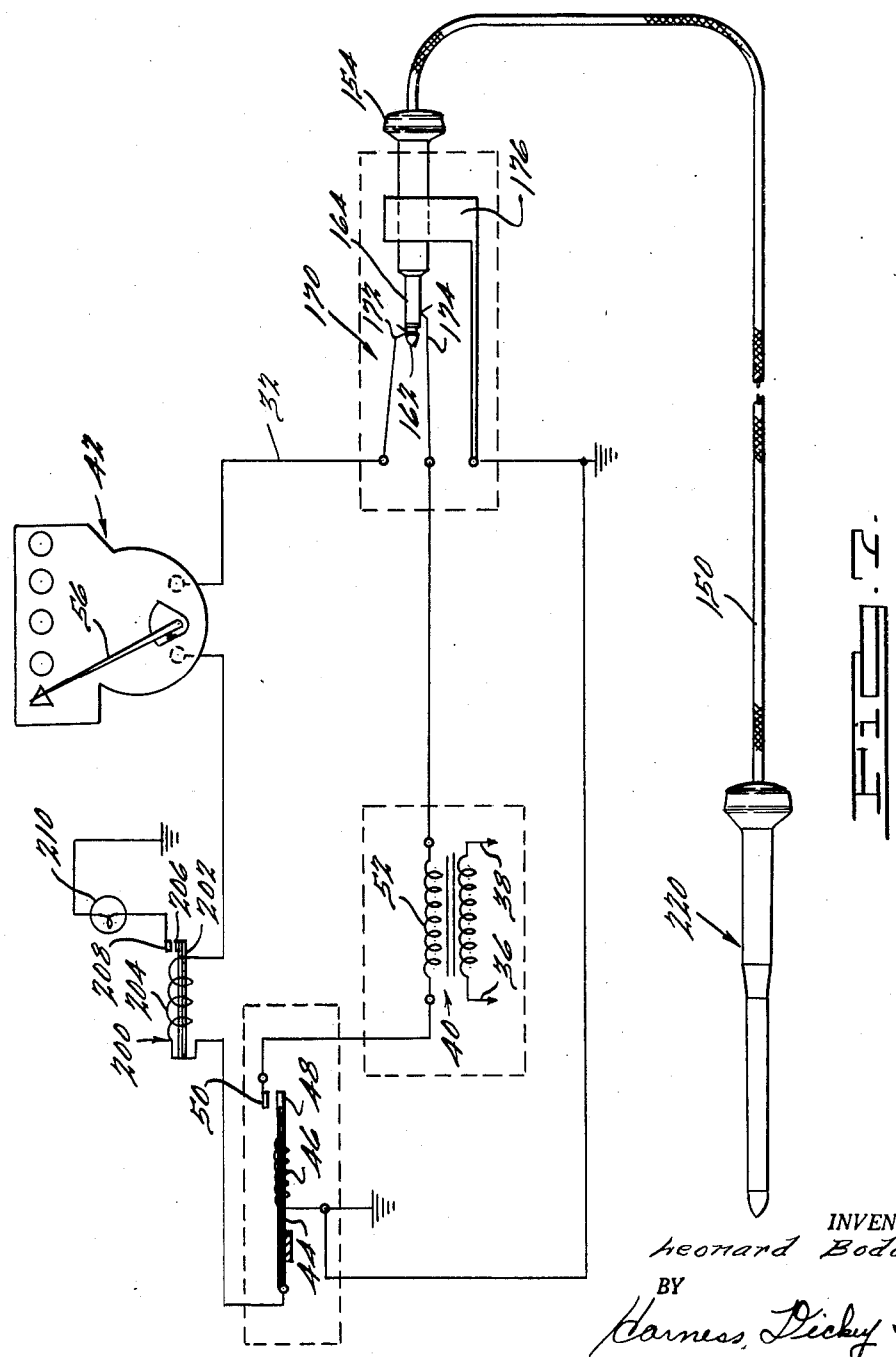

United States Patent Office 2,925,572
Patented Feb. 16, 1960

2,925,572

TEMPERATURE MEASURING PROBE

Leonard Boddy, Ann Arbor, Mich., assignor to King-Seeley Corporation, Ann Arbor, Mich., a corporation of Michigan Application July 26, 1955, Serial No. 524,549

4 Claims. (Cl. 338—28)

This invention relates to temperature measuring systems and, more particularly, to an improved culinary temperature measuring system for indicating the temperature of roasts, fowl, and the like. Certain features of the temperature measuring system disclosed in this application are not claimed in this application but are claimed in the application of Ernest L. Klavitter, Serial No. 532,521, filed September 6, 1955, now Patent No. 2,886,683, and the application of Harry I. Baker, Serial No. 539,845, filed October 11, 1955, now Patent No. 2,890,429, said applications being assigned to the assignee of the present invention.

An object of the present invention is to overcome disadvantages in prior systems of the indicated character and to provide an improved temperature measuring system incorporating improved means for measuring the temperature of roasts, fowl and the like during the cooking thereof.

Another object of the invention is to provide an improved temperature indicating mechanism incorporating improved means for indicating the cooking progress of roasts, fowl and the like.

Another object of the invention is to provide an improved temperature measuring system incorporating improved probe means which is adapted to determine the interior temperature of roasts, fowl and the like and which is adapted to withstand the relatively high temperatures to which it is necessarily subjected.

Another object of the invention is to provide an improved temperature measuring system which reduces the labor incident to the cooking of roasts, fowl and the like.

Another object of the invention is to provide an improved temperature indicating mechanism incorporating improved heat transfer means which facilitates the accurate measurement of the interior temperature of roasts, fowl and the like.

Another object of the invention is to provide an improved temperature measuring system incorporating improved control means actuable upon the attainment of a predetermined critical temperature.

Another object of the invention is to provide an improved temperature measuring system that is economical to manufacture and assemble, durable, efficient and reliable in operation.

Another object of the invention is to provide an improved culinary temperature measuring system which may be supplied as a part of the original equipment of a stove or which may be conveniently added thereto as an accessory.

The above as well as other objects and advantages of the present invention will become apparent from the following description, the appended claims and the accompanying drawings wherein:

Figure 1 is a perspective view of a temperature measuring system embodying the present invention, showing the same in installed relationship with respect to a stove;

Fig. 2 is a schematic circuit diagram of the temperature measuring system illustrated in Fig. 1;

Fig. 3 is an enlarged sectional view of the probe assembly of the system illustrated in Fig. 2;

Fig. 4 is a sectional view of a portion of the probe illustrated in Fig. 3, showing the same prior to the final assembly thereof;

Fig. 5 is an enlarged elevational view, with portions in section, of the jack illustrated in Fig. 2;

Fig. 6 is an enlarged view of the tip end portion of the probe illustrated in Fig. 3;

Fig. 7 is a schematic circuit diagram of another embodiment of the invention;

Fig. 8 is an enlarged, longitudinal, sectional view of the probe assembly illustrated in Fig. 7;

Fig. 9 is an enlarged sectional view of a portion of the structure illustrated in Fig. 7; and Fig. 10 is an enlarged sectional view of a portion of the probe illustrated in Fig. 8.

Referring to the drawings, and more particularly to Fig. 1, the present invention is shown in installed relationship with respect to an electric stove, generally designated 20, although it will be understood that the present invention is applicable to other uses. The stove 20 includes a body portion 22 which defines an oven chamber 24, and an oven door 26 is provided which is hingedly connected to the body portion 22 for swinging movement to and from closing relationship with respect to the oven 24. The stove 20 is also shown as being provided with an upwardly extending panel 28 upon which are mounted the burner and oven controls.

In accordance with the present invention, a temperature measuring system, generally designated 30, is provided for indicating the interior temperature of roasts, fowl and the like as they are being cooked in the oven 24.

In the embodiment of the invention illustrated in Figs. 1–6, the temperature measuring system 30 includes a gauging circuit 32 which receives electric energy, at a voltage regulated by a voltage regulator 34, from a source 36. The source 36 may be of various types, and when the present invention is used in connection with domestic stoves, the source 36 may, for example, comprise a conventional A.C. power line 38 and a step-down transformer 40, the step-down transformer 40 being interposed between the line 38 and the gauging circuit 32 and serving to reduce the voltage of the line 38 within limits which are acceptable for underwriting and safety purposes.

In practice, the voltage received from the line 38 varies between limits which are not close enough for satisfactory operation of a desirably simple electric gauge. For example, the voltage of the line 38 may vary as much as ten volts.

The voltage regulator 34 receives the noticeably variable output of the source 36, and delivers pulsating energy to the gauging circuit 32, the effective voltage of the regulator 34 being substantially independent of variations in the voltage of the source. Under these conditions, it will be appreciated that a relatively simple rheostatic element may be utilized in the gauging circuit, the rheostatic element serving to vary the resistance in the gauging circuit in response to variations in temperature in the roast, and thereby controlling the current through and, consequently, the position of a gauge 42 which is interposed in the gauging circuit 32.

The regulator 34 may, for example, be of the type disclosed in the copending application of Leonard Boddy, Serial No. 103,773, filed August 5, 1949, now Patent No. 2,674,836, for Electrical Control Apparatus, and assigned to the assignee of the present invention. In general, the regulator 34 may be characterized as including a thermally responsive member 44, at least a portion of which tends to move as a consequence of changes in the temperature thereof. Current modulating means are associated with this member so as to respond to the tendency to move. The current modulating means serves to increase the heating current supplied to the regulator in response to decreases in temperature thereof and vice versa. Consequently, throughout at least a predetermined range of voltages of the source, the current modulating means periodically increases or decreases the current supplied to the thermally responsive member and causes it to be maintained at a substantially uniform average temperature. On this basis, it will be appreciated that the thermally responsive member receives energy in pulsating form, at a substantially uniform rate. This energy rate may, of course, be expressed as $E^2/r$, E being the effective or root mean square voltage of the energy pulsations and $r$ being the electrical resistance of the regulator. Under any given ambient temperature condition, the electrical resistance of the regulator may, for all practical purposes, be regarded as constant. Consequently, for any given ambient temperature condition, the effective voltage of the energy pulsations absorbed by the regulator is also substantially constant and independent of variations in the voltage of the associated source of energy. The control of the effects of the ambient temperature changes may be effected in accordance with the invention disclosed in the aforementioned copending application.

The regulator 34 may further be characterized in that it may be adapted to have an associated gauge or load circuit connected thereto in parallel with the current consuming elements of the regulator, and subject to the current modulating means. Consequently, the load circuit also receives energy pulsations having an effective voltage which is substantially independent of variations in the voltage source. In addition, the load current has no appreciable heating effect on the thermally responsive element. Consequently, the effective voltage established by the regulator is independent of the relative magnitude of the heating and load currents. Furthermore, if desired, a plurality of load circuits may be connected in parallel with one regulator and the load currents may be individually varied at random without affecting in any way the action of the regulator.

As diagrammatically shown in Fig. 2, the regulator 34 may comprise a thermally responsive trimetallic element 44 which carries a heater winding 46. One terminal of the winding 46 is grounded as indicated and the other terminal thereof is electrically connected to the element 44. The current modulating means comprises a pair of contacts 48 and 50, the element 44 carrying the movable contact 48 which normally engages the fixed contact 50. The contact 50 is connected to one terminal of the secondary winding 52 of the stepdown transformer 40, the other terminal of the secondary winding being connected to the gauging circuit, as will be described hereinafter in greater detail.

With this relationship, it will be appreciated that when the gauging circuit is closed, a circuit is also completed from the secondary winding 52 of the transformer through the contacts 50 and 48, the body of the element 44 and the heater winding 46 to ground. Completion of this circuit supplies heat to the element 44 and causes its temperature to rise. As is disclosed in the aforementioned copending application, the electrical resistance of the element 44 is so low that for all practical purposes, all of the heating effect can be considered as being derived from the winding 46. Consequently, the element 44 can also serve as a conductor for both the gauging and the heating currents.

Upon being heated, the element 44 warps and separates the contacts 48 and 50, interrupting the circuit through the winding 46. If desired, a shunt resistor may be connected in parallel with the contacts 48 and 50 so as to merely reduce the heating effect of the winding rather than interrupt the current therethrough. When the circuit is interrupted through the winding 46, the element 44 then cools and restores the contacts 48 and 50 to the closed position. Accordingly, as soon as the gauging circuit is closed, the contacts 48 and 50 are periodically opened and closed and the heating current is correspondingly modulated. Consequently, the element 44 acquires a temperature just high enough to hold the contacts 48 and 50 in a condition of incipient closing and opening. This critical temperature can be variously determined, as an incident to manufacture, by adjusting the position of the fixed contact 50 relative to the movable contact 48, so as to correspondingly determine the initial pressure between the contacts. Consequently, neglecting ambient effects, the regulator acts to receive from the source 36 an amount of electric energy, in pulsating form, which has a substantially uniform heating value. On this basis, and since over any period of time the wattage input to the regulator heater ($E^2/r$) is at a constant rate, it is evident that the regulator breaks up the energy supplied by the source 36 into a succession of pulses having an effective voltage which is independent of the variations in the voltage of the source 36.

The voltage impressed across the winding 46 is, of course, equal to the voltage impressed upon the gauging circuit. The gauging circuit 32, therefore, is supplied from the source with pulsating energy at an effective voltage which is substantially independent of variations in the voltage of the source. The regulator 34 thus effectively serves as a regulator of the voltage impressed across the gauging circuit, and current drawn by the gauging circuit is thus independent of variations in voltage of the source.

It will be understood that, if desired, the regulator can be so arranged that the current impulses vary gradually between finite upper and lower values instead of abruptly between a finite upper and lower value. For example, the current modulating means could be replaced by a carbon pile of the type disclosed in the aforementioned copending application, one end of the carbon pile receiving a variable pressure exerted by the end of the element 44. The resistance of such a carbon pile, of course, varies inversely with the pressure exerted thereon. In this case, changes in temperature of the element 44 would tend to cause it to warp but may not cause an actual warpage, whereas in the embodiment of the invention illustrated in Figs. 1–6, the tendency to warpage produces a finite movement of the element. Alternatively, the regulator may be replaced by a regulator of the hot wire type such as is disclosed in the aforementioned copending application.

In the broader aspects of the invention, any of a variety of well-known electroresponsive constructions can be employed in connection with the gauge 42, the diagrammatically shown movable elements of which may function to commutate circuits, provide visual indications or otherwise. Preferably, the gauge 42 is of the well-known temperature compensated thermostatic type. Such a gauge employs a bimetallic element which carries a heater winding, warping of the bimetallic element actuating an indicating needle in any well-known manner.

It will be appreciated that the use of a thermostatic gauge is advantageous in that it inherently has some heat capacity which can be matched with the performance of the regulator 34 so that the individual pulsations introduced by the regulator into the current supply are integrated by the gauge. In typical cases, the pulsating rate may, for example, be between sixty and ninety pulsations per minute.

In the embodiment of the invention illustrated, the gauge 42 is electrically connected in series with a resistor having an inverse temperature coefficient of resistance, the resistor being disposed in a probe assembly, generally designated 54, which will be described hereinafter in greater detail. The probe assembly is adapted to be inserted in a roast, fowl or the like so that the tip portion thereof is disposed in the center or other desired region thereof, the temperature of which it is desired to measure. Thus, changes in the temperature of the resistor effect a corresponding change in the position of the indicating needle 56 of the gauge 42.

Referring now to Figs. 3, 4 and 6, one form of probe assembly is illustrated. In these figures, the previously referred to variable resistor is designated as 58 and is shown as being of flat, circular, disc-like form. The resistor 58 is interposed between a pair of soft silver discs 60 and 62 to insure good thermal conductivity of the assembly, and to insure intimate contact with the resistor. The silver discs 60 and 62 are preferably malleable and fill any rough areas or grooves which may be formed in the surfaces of the resistor during the manufacturing thereof. The resistor 58 and the silver discs 60 and 62 are disposed in one end portion of a tubular casing 64 having a relatively thin wall 66 which defines a bore 68. The casing 64 is preferably formed of stainless steel which is electrically conductive but which has relatively poor thermal conductivity characteristics. A tip member 70 is provided which includes a pointed substantially conoidal body portion 72 and an integral substantially cylindrical throat portion 74. The tip member 70 is preferably formed of solid copper, although it will be understood that other materials having relatively high thermal conductivity characteristics may be utilized. The body portion 72 projects axially outwardly from the casing 64, and the surface 75 of the body portion 72 is adapted to be disposed in and contact the central section of the roast, fowl or the like, the temperature of which it is desired to measure. The throat portion 74 is pressed into the bore 68 of the casing 64 to electrically connect the tip and the casing, and the silver disc 62 is pressed into intimate contact with the inner end of the tip member 70 so as to insure good electrical and thermal conductivity between the resistor 58 and the tip 70. When the circuit 32 is closed, the resistor 58 is energized and the temperature of the resistor rises because of the current flowing therethrough. Since the resistor 58 is in intimate contact with the silver disc 62 which, in turn, is in intimate contact with the adjacent end of the throat portion 74 of the tip 70, the heat generated by the resistor flows through the throat portion 74 and the body portion 72 of the tip 70, the surface 75 of the body portion 72 being in contact with the meat. In order to insure that the heat is transferred from the tip to the roast and to provide a temperature measurement which is a measure of the mean temperature of the entire section of the roast with which the tip is in contact, the tip 70 is constructed so that the area of the heat transfer surface 75 of he body portion 72 is at least twice the transverse cross-sectional area of the throat portion 74. It will be appreciated that when the probe is inserted in a roast, fowl or the like, the body portion 72 may be in contact with meat, bone, fat, muscle and other portions thereof, the heat transfer characteristics of which vary widely. Since the area of the surface 75 is relatively large and is at least twice the transverse cross-sectional area of the throat portion 74, the temperature measurement obtained by the probe is the mean temperature of the entire section in which the tip 70 is disposed. Thus, the copper tip increases the area of the heat transfer surfaces of the resistor 58 so that heat is transferred from the thermistor to the meat and the meat, in effect, quenches the thermistor, with the result that the thermistor is maintained at a temperature which is substantially the mean temperature of the section of the roast in which the tip 70 is disposed. On the other hand, the stainless steel casing 64 is a relatively poor conductor of heat and the wall 66 of the casing is relatively thin in section so that a relatively poor heat path is provided from the oven to the tip and the temperature of the oven does not directly govern the temperature of the thermistor.

In order to provide a fluid-tight seal at the tip end of the bore 68 and to electrically connect the tip 70 to the casing 64, the tip is silver soldered to the casing, as at 76, the solder being initially placed in a groove 78 provided in the throat portion of the tip member 70 at a position spaced from the inner end thereof.

A ceramic locating cup 80 provided with a forwardly extending sleeve portion which defines a recess 82 that spacedly encompasses the thermistor 58 so as to electrically insulate the thermistor from the casing 64. The edge portion 84 of the cup terminates in spaced relationship with respect to the silver disc 60 with the result that pressure applied to the cup 80 is also applied to the disc 62 and thermistor 58 thereby insuring intimate contact between the silver discs 60 and 62 and the thermistor 58, and between the silver disc 62 and the inner end of the tip member 70.

It will be appreciated that the probe assembly may be expected to come into contact with various liquids during use, as for example, the probe assembly may be submerged in water for washing purposes. In order to prevent fluid from coming into contact with the thermistor 58, a silicon rubber seal 86 is provided adjacent the cup 80. Materials suitable for this purpose include "Silastic," which is made available commercially by the Dow Chemical Company of Midland, Michigan. The sealing member 86 is adapted to withstand the temperatures to which the probe assembly is subjected and is expanded into intimate contact with the inner surfaces of the shell member 64 by a coil spring 88, one end portion of which bears against a ceramic washer 90 which is interposed between the sealing member 86 and the spring 88. For the purpose of equalizing the pressure on the ceramic washer 90, a metal washer 92 is provided which is fitted between the sealing member 86 and the ceramic washer 90. The sealing means of both embodiments of the invention disclosed in the present application are not claimed in the present application but are claimed in the above identified application of Ernest L. Klavitter.

The opposite end portion of the spring 88 bears against a metallic washer 94, the washer 94, in turn, bearing against an internal abutment 96 which is formed on the wall 66 of the shell member 64 during the assembly of the probe. An electrical conductor 98 is provided which is disposed in a glass insulator 100 that extends axially through the bore 68 of the casing 64 and through the washer 94, the spring 88, and the ceramic washer 90. The insulator terminates adjacent the washer 92 and the conductor 98 extends through the metallic washer 92, the sealing member 86 and the cup 80, the free end of the conductor 98 being silver soldered to the disc or electrical contact element 60, as at 102. With such a construction, an electrical circuit is provided in the probe from the conductor 98 through the disc 60, the resistor 58, the disc 62, and the tip member 70 to the casing 64. It is preferred that the conductor 98 be formed of nickel or other material having relatively poor thermal conductivity characteristics, or in the alternative, that the conductor 98 be relatively small in cross section to reduce the thermal conductivity thereof, such a construction reducing the transfer of heat from the oven to the thermistor.

As shown in Fig. 3, at a position spaced from the abutment stop 96, the casing flares outwardly, as at 104, and a cup washer 106 is fitted in the bore 68 so as to extend substantially perpendicular to the longitudinal axis of the bore. A "Silastic" sealing member 108 is provided which is fitted in the bore 68 and which abuts the cup washer 106. The "Silastic" sealing member 108 defines a bore 110 having an enlarged portion 112. One end portion of the glass tube 100 is fitted in the bore 110 and a brass bushing 114 is fitted in the enlarged portion 112 of the bore 110, the brass bushing 114 being brazed to the conductor 98. A ceramic washer 116 is provided which is fitted in the bore 68 so as to abut the "Silastic" sealing member 108. A glass tube 118 is also fitted in the bore 68, the glass tube 118 spacedly encompassing a Silastic-coated conductor 120 having one end portion thereof electrically connected to the bushing 114. The glass tubes 100 and 118 are preferably formed of Pyrex or other material adapted to withstand the heat to which the probe assembly is subjected and the outside diameter of the glass tube 118 is less than the inside diameter of the bore 68 so that the wall of the shell member spacedly encompasses the glass tube 118. A Silastic-coated conductor 122 is also provided which is connected to a cap member 124 which will be described hereinafter in greater detail. During the assembly of the probe, the conductors 120 and 122 are electrically connected together, as by a soft copper connector 126, the connector 126 being covered by an insulator 128 which may be formed of Silastic or other suitable material. A washer 129 is provided which bears against the end portion of the tube 118 remote from the washer 116, and a coil spring 131 is provided which serves to apply pressure to a Silastic seal 133 which serves to seal the end portion of the bore adjacent the cap assembly 124, suitable washers 130 and 132 being interposed between the seal 133 and the spring 131 and between the seal 133 and the cap member 124. The cap member 124 includes a knob portion 134, a neck portion 136 and a head portion 138. The conductor 122 includes an insulator portion 140 which passes through the washer 129, the coil spring 131, washer 130, sealing member 133, washer 132 and the head, neck and body portions of the cap assembly 124. The conductor 122 also includes a metallic braid 142 which extends through the body portion 134, the neck portion 136 and a portion of the head 138 of the cap member, the head portion 138 being crimped, as at 144, so as to electrically connect the head portion to the braid. In the assembly of the probe, the cap 124 is coaxially aligned with the casing 64, and the head portion 138 and neck portion 136 are pressed into the bore of the shell member, the spring 131 being compressed so as to apply pressure to the sealing member 133 and force the periphery of the sealing member into intimate contact with the wall of the casing. The casing is then crimped as at 146 so as to electrically connect the wall 66 of the casing to the neck portion 136 of the cap member 124.

The conductor 122 and the braid 142 are included in a cable, generally designated 150, the braid being electrically insulated from the conductor 122 by the insulation 140.

A plug assembly, generally designated 154, is fixed to the remote end of the cable 150. The plug assembly 154 includes a body portion 156 which defines a bore 158 and which is provided with a knob portion 160. The plug assembly also includes a tip 162 and a ring 164 which encompasses the tip 162 in the conventional manner and which is electrically insulated therefrom. The cable 150 extends into the bore 158 and the conductor 122 is electrically connected to a terminal 166, the terminal 166 being electrically connected to the tip 162 and being electrically insulated from the sleeve 164. The braid 142 is electrically connected to a terminal 168, the terminal 168 being electrically connected to the sleeve 164 and being electrically insulated from the tip 162. The plug 156 is adapted to be inserted in a jack 170, as shown in Fig. 2, the jack being mounted in the wall of the oven. The jack 170 includes a contact 172 which is adapted to contact the tip 162 of the plug and which is electrically connected to the gauging circuit 32. The jack also includes a contact 174 which is adapted to contact the sleeve 164 of the plug and which is electrically connected to the secondary winding 52 of the transformer.

If desired, the jack 170 may be provided with a sleeve contact 176 which is adapted to electrically contact the body portion of the plug, the sleeve contact 176 being grounded, as at 178. It will be noted that the circuit through the probe as well as the circuit through the indicator, the voltage regulator, and the transformer is completely open when the plug is removed from the jack.

In the operation of this embodiment of the invention, the plug 154 is inserted in the jack 170 and the probe 54 is inserted in the roast so that the tip 70 is located at a position substantially in the center of the roast. When the plug 154 is inserted in the jack, a circuit is completed from the contact 172 through the tip 162 of the plug, the conductor 122, the conductor 120, the conductor 98, the silver disc 60, thermistor 58, silver disc 62, the tip 70, the casing 64, the cap member 134, the braid 150, the sleeve 164 of the plug 154, to the contact 174 of the jack. Upon completion of the just-traced circuit, the thermistor 58 is heated due to the resistance thereof and the heat emitted by the thermistor 58 is conducted through the silver disc 62 and the copper tip 70 to the roast. Since the area of the surface 75 is at least twice the transverse cross-sectional area of the throat 74, the tip 70 increases the area of the heat transfer surfaces of the thermistor so that the thermistor, in effect, is quenched by the roast, and the thermistor assumes a temperature which is substantially the same as the temperature of the roast. Since the resistance of the thermistor is a function of the temperature thereof, the current flowing through the gauge 42 is a function of the mean temperature at the center of the roast and the needle 56 of the gauge moves proportionately to the warping of the bimetallic element of the gauge, the bimetallic element of the gauge, in turn, being heated by the heater winding of the gauge in the conventional manner. As the temperature at the center of the roast increases, the current flowing through the thermistor also increases with the result that additional heat is imparted to the bimetallic element of the gauge by the heater winding therein, thereby effecting a higher reading of the needle element 56 on the associated scale of the gauge. The voltage of the circuit is regulated by the voltage regulator 34, as previously described, to insure the accuracy of the measurement.

In this embodiment of the invention, the cook watches the progress of the needle 56 of the gauge and when the needle reaches a predetermined position, indicating, for example, that the roast is well-done, the oven is turned off and the roast removed therefrom.

Another embodiment of the invention is illustrated in Figs. 7–10. This embodiment of the invention includes the transformer 36, the voltage regulator 34, the gauge 42, the jack 170, the plug 154, and the cable 150.

In this embodiment of the invention, an integrating control relay 200 is provided having a bimetallic element 202 which carries a heater winding 204. The heater winding 204 is connected in series with the gauge 42 so that the bimetallic element 202 is heated by the heater winding 204 and deflected proportionately to the current flowing through the gauge 42. The bimetallic element 202 carries a contact 206 which is adapted to engage a contact 208. If desired, the contact 208 may be mounted on an adjustable screw so that the position of the contact 208 may be varied relative to the contact 206. In the embodiment of the invention illustrated, the contact 208 is shown as connected to ground through a signal element 210, although it will be understood that other electro-responsive devices may be controlled by the relay 200. The heater winding 204 is also connected to the bimetallic element 202 with the result that when the contact 206 makes with the contact 208, a circuit is completed through the signal element so as to energize the same. Thus, when the gauge reaches a predetermined position, the bimetallic element 202 is deflected proportionately so that the contact 206 makes with the contact 208 to signal that the roast has reached a predetermined temperature, the initial position of the contact 208 relative to the contact 206 determining the temperature at which the signal element is energized. It will be understood that the control relay 200 may be advantageously employed to perform other functions, as for example, the control relay may control the heater elements for the oven so that the oven is turned off when the roast is done.

Referring now to Figs. 8, 9 and 10, a probe assembly, generally designated 220, is provided in this embodiment of the invention. The probe assembly 220 houses a thermistor 222 which is interposed between a pair of soft silver discs 224 and 226. The resistor 222 is shown as being of flat, circular, disc-like form and the silver discs 224 and 226 insure intimate contact with the resistor. The silver discs are preferably malleable and fill any rough areas or grooves which may be formed in the surfaces of the resistor during the manufacturing thereof. The resistor 222 and the discs 224 and 226 are disposed in one end portion of a tubular shell 228, having a relatively thin wall 230 which defines a bore 232. The shell 228 is preferably formed of stainless steel which is electrically conductive but which is a relatively poor conductor of heat. A tip 236 is provided which includes a pointed substantially conoidal body portion 238 and an integral substantially cylindrical throat portion 240. The tip member 236 is preferably formed of solid copper, although it will be understood that other materials having relatively high thermal conductivity characteristics may be utilized. The body portion 238 projects outwardly from the casing 228 and the surface 241 of the body portion 238 is adapted to be disposed in and contact the central section of the roast, fowl or the like, the temperature of which it is desired to measure. The throat portion 240 is pressed into the bore 232 of the shell 228 and the silver disc 226 is pressed into intimate contact with the inner end of the throat portion 240 of the tip 236 so as to insure good thermal conductivity between the resistor 222 and the tip 238. When the circuit 32 is closed, the resistor 222 is energized, and the temperature of the resistor rises because of the current flowing therethrough. Since the resistor 222 is in intimate contact with the silver disc 226, which, in turn, is in intimate contact with the adjacent end of the throat portion 240 of the tip 236, the heat generated by the resistor flows through the throat portion 240 and the body portion 238 of the tip 236, the surface 241 of the body portion 236 being in contact with the meat. In order to insure that the heat is transferred from the tip to the roast and to provide a temperature measurement which is a measure of the mean temperature of the entire section of the roast with which the tip is in contact, the tip 236 is constructed so that the area of the heat transfer surface 241 of the body portion 238 is at least twice the transverse cross-sectional area of the throat portion 240. It will be appreciated that when the probe is inserted in the roast, fowl or the like, the body portion 238 may be in contact with meat, bone, fat, muscle or other portions thereof, the heat transfer characteristics of which vary widely. Since the area of the surface 241 is relatively large and is at least twice the transverse cross-sectional area of the throat portion 240, the temperature measurement obtained by the probe is the mean temperature of the entire section in which the tip 236 is disposed. Thus, the copper tip 236 increases the area of the heat transfer surfaces of the thermistor so that heat is transferred from the thermistor to the meat, and the meat, in effect, quenches the thermistor with the result that the thermistor is maintained at a temperature which is substantially the mean temperature of the section of the roast in which the tip is disposed. On the other hand, the stainless steel shell 228 is a relatively poor conductor of heat and the wall 230 of the shell is relatively thin in section so that a poor heat path is provided from the oven to the tip and the temperature of the oven does not directly govern the temperature of the thermistor.

In order to provide a fluid-tight seal at the tip end of the bore 232 and to electrically connect the tip to the casing, the tip is silver soldered to the casing, as at 242 and 244, the solder being intially placed in grooves 246 and 248 provided in the throat portion 240 of the tip member 236.

A ceramic locating cup 250 provided with a forwardly extending sleeve portion which defines a recess 252 adapted to receive the silver disc 224 and a portion of the thermistor 222, the marginal portions of the locating cup 250 spacedly encompassing the disc 224 and the thermistor 222 so as to electrically insulate the thermistor from the casing. The end 254 of the cup terminates in spaced relationship with respect to the silver disc 226 so that pressure applied to the cup 250 is also applied to the disc 224 and the thermistor 222 thereby insuring intimate contact between the silver disc and the thermistor and between the silver disc 226 and the tip member 236. In order to prevent fluid from coming into contact with the thermistor 222, a silicon rubber seal 256 is provided adjacent the cup 250, the seal 256 preferably being formed of "Silastic" or other suitable material which is adapted to withstand the temperatures to which the probe is subjected, and which may be expanded into intimate contact with the inner surfaces of the shell member.

The Silastic seal 256 bears against a washer 258 and the washer 258, in turn, bears against an elongate ceramic tubular member 260. The opposite end of the ceramic tubular member 260 bears against a ceramic spring seat 262. For the purpose of expanding the sealing elements and to provide pressure on the thermistor and disc elements, a single coil spring 264 is provided, one end portion of which bears against the spring seat 262 while the opposite end portion of the spring 264 bears against a washer 266, the washer 266, in turn, bearing against a "Silastic" sealing element 268. The spring means of this embodiment of the invention is not claimed in this application but is claimed in the above identified application of Harry I. Baker.

An electrical conductor 270 is provided which extends axially of the shell member through the ceramic tubular member 260, the washer 258, sealing member 256 and the ceramic cup 250. One end of the conductor 270 is silver soldered or otherwise electrically connected to the disc or electrical contact element 224, as at 272, while the opposite end of the conductor 270 is electrically connected to a stranded conductor 274, as by a connector 276. In order to electrically insulate the conductors 270 and 274 from the spring 264, an insulating sleeve 278 is provided which is interposed between the spring 264 and the conductors 270 and 274. The conductor 274 may be a part of the braided cable 150, and extends through the washer 266, the sealing member 268, a washer 280 and a cap assembly 282. The cap member 282 includes a body portion 284, a neck portion 286 and a head portion 288, the neck portion 286 being provided with circumferentially spaced grooves 290. The head portion 288 is crimped as at 292 so as to electrically connect the cap assembly 282 to the braid 142 of the cable 150 and the casing wall 230 is crimped into the recesses 290, as at 294, so as to electrically connect the casing to the cap member 282. The cable 150 is connected to the plug 154 in the manner previously described.

From the above description, it will be appreciated that an electrical circuit is provided which extends from the conductor 274 through the conductor 270, the silver disc 224, thermistor 222, silver disc 226, copper tip 236, the wall 230 of the casing 228, the cap assembly 282 to the braid 142 of the cable 150. The plug 154 is adapted to connect the conductor 274 to the contact 172 of the jack, and the braid 142 to the contact 174 of the jack in the manner previously described. In order to minimize the transfer of heat from the oven to the thermistor, it is preferred that the conductor 270 be formed of a material having relatively poor thermal conductivity characteristics, or that the conductor be relatively small in cross section.

In the operation of this embodiment of the invention, the probe 220 is inserted into the roast so that the tip 236 is located substantially at the center of the roast and the plug 154 is inserted into the jack 170. The position of the contact 208 relative to the contact 206 may also be adjusted so that a signal or other control function will be provided upon the attainment of a predetermined temperature. When the plug 154 is inserted into the jack, a circuit is completed from the secondary winding 52 of the transformer through the contacts 50 and 48 of the voltage regulator, the winding of the integrating relay 200, the gauge 42, conductor 32, the contact 172 of the jack, tip 162 of the plug, conductor 274, conductor 270, the thermistor 222, the tip 238, the wall 230 of the casing 228, the cap member 282, the braid 142 of the cable 150, sleeve 164, and the contact 174 to the other terminal of the secondary winding 152 of the transformer. Upon completion of the just-traced circuit, the thermistor 222 is heated due to the resistance thereof and the heat is conducted from the thermistor through the silver disc 226 to the tip 236. Since the area of the surface of the body portion 238 is at least twice the cross-sectional area of the throat, the tip 236 increases the area of the heat transfer surfaces of the thermistor 222 so that, in effect, the meat of the roast quenches the thermistor. Accordingly, the thermistor assumes a temperature which is substantially the same as the mean temperature at the center of the roast. As the temperature at the center of the roast increases, the resistance of the thermistor decreases and the current flowing through the above-traced circuit also increases. The current flowing through the circuit also flows through the winding 204 of the integrating relay 200 and through the heater winding of the gauge 42 so that the needle 56 of the gauge assumes a position proportional to the flow of current through the above-traced circuit. As the same time, the bimetallic element 202 warps due to the heating effect of the winding 204. When the current flowing through the winding 204 reaches a predetermined value, sufficient heat is imparted to the bimetallic element 202 to warp the element 202 sufficiently to cause the contact 206 to make with the contact 208. A second circuit is then completed through the bimetallic element 202, the contacts 206 and 208, and the signaling element 210, thereby indicating that the temperature at the center of the roast has reached a predetermined value.

While preferred embodiments of the invention have been shown and described, it will be understood that various changes and modifications may be made without departing from the spirit of the invention.

What is claimed is:

1. In a temperature measuring system for measuring the temperature of meat, fowl and the like, a temperature responsive current modulating device comprising an elongate tubular casing defining a bore open at each end, said tubular casing being formed of an electrical conductive metal having relatively low thermal conductivity characteristics, a conoidal tip having a throat portion and a body portion, said throat portion being disposed in said bore in electrical conducting relationship with respect to said casing, said tip being formed of a metal different from the metal of said casing and having relatively high thermal conductivity characteristics, a first electrical and heat conductive disc disposed in said bore in electrical conducting and heat transfer relationship with respect to said throat portion, said body portion projecting axially outwardly from said casing, the area of the surface of said body portion being at least twice the transverse cross-sectional area of said throat portion, variable resistance means including a disc-like element having a coefficient of electrical resistance which varies substantially as a function of the temperature of the element, said element being disposed in said bore in good electrical conducting and in good heat transfer relationship with respect to said first disc, a second electrical conducting disc disposed in said bore in electrical conducting engagement with said element, spring means maintaining said discs and said element in electrical conducting relationship, and electrical insulating sleeve means disposed directly between said casing and said element and directly between said casing and at least one of said discs for preventing direct electrical contact between said one of said discs and said casing and between said element and said casing.

2. The combination of claim 1 further including a circumferential groove in said throat portion, and means including solder within said groove and engaging a portion of the inner surface of said casing for electrically interconnecting said tip and said casing and for establishing a fluid-tight seal between said tip and said casing.

3. In a temperature measuring system for measuring the temperature of meat, fowl and the like, a temperature responsive current modulating device comprising an elongate tubular casing defining a bore open at each end, said tubular casing being formed of an electrical conductive metal having relatively low thermal conductivity characteristics, a conoidal tip having a throat portion and a body portion, said throat portion being disposed in said bore in electrical conducting relationship with respect to said casing, said tip being formed of a metal different from the metal of said casing and having relatively high thermal conductivity characteristics, a malleable silver electrical and heat conductive disc disposed in said bore in electrical conducting and heat transfer relationship with respect to said throat portion, said body portion projecting axially outwardly from said casing, the area of the surface of said body portion being at least twice the transverse cross-sectional area of said throat portion, variable resistance means including a disc-like thermistor element having a coefficient of electrical resistance which varies substantially as an inverse function of the temperature of the element, said element being disposed in said bore in good electrical conducting and in good heat transfer relationship with respect to said malleable silver disc, an electrical contact element disposed in said bore in electrical conducting engagement with said element, a conductor within said casing and having one end electrically and mechanically secured to said contact element, spring means maintaining said contact element and said thermistor element in electrical conducting relationship, and means preventing direct electrical contact between said contact element and said casing and between said thermistor element and said casing.

4. The combination of claim 3 further including a circumferential groove in said throat portion, and means including solder within said groove and engaging a portion of the inner surface of said casing for electrically interconnecting said tip and said casing and for establishing a fluid-tight seal between said tip and said casing.

References Cited in the file of this patent

UNITED STATES PATENTS

| | | |
|---|---|---|
| 2,476,099 | Knudsen | July 12, 1949 |
| 2,552,480 | Dickey | May 8, 1951 |
| 2,609,406 | Barsy | Sept. 2, 1952 |
| 2,635,137 | Basham | Apr. 14, 1953 |
| 2,657,580 | Schroeder | Nov. 3, 1953 |
| 2,753,714 | Perkins | July 10, 1956 |